(12) United States Patent
Kotter

(10) Patent No.: US 11,986,111 B2
(45) Date of Patent: May 21, 2024

(54) PHONE AND DRINK HOLDER

(71) Applicant: Kenneth Coburn Kotter, Mandeville, LA (US)

(72) Inventor: Kenneth Coburn Kotter, Mandeville, LA (US)

( * ) Notice: Subject to any disclaimer, the term of this patent is extended or adjusted under 35 U.S.C. 154(b) by 261 days.

(21) Appl. No.: 17/368,681

(22) Filed: Aug. 11, 2021

(65) Prior Publication Data
US 2022/0010566 A1 Jan. 13, 2022

Related U.S. Application Data

(60) Provisional application No. 63/048,904, filed on Jul. 7, 2020.

(51) Int. Cl.
*A47G 23/02* (2006.01)
*E04G 5/00* (2006.01)
*E04G 5/06* (2006.01)

(52) U.S. Cl.
CPC ......... *A47G 23/0225* (2013.01); *E04G 5/003* (2013.01); *E04G 5/061* (2013.01)

(58) Field of Classification Search
CPC ........... E04G 5/003; E04G 5/06; E04G 5/061; E04G 5/065; E04G 5/067; E04G 2005/068; E06C 7/14; A47G 23/0225; B25H 3/06
USPC .................................. 182/129; 248/210, 238
See application file for complete search history.

(56) References Cited

U.S. PATENT DOCUMENTS

| | | | | |
|---|---|---|---|---|
| 4,874,147 A * | 10/1989 | Ory | ............................ | E06C 7/14 248/223.41 |
| 5,333,823 A * | 8/1994 | Joseph | ....................... | E06C 7/14 248/210 |
| 5,613,574 A * | 3/1997 | Melanson | .................. | E06C 7/14 248/238 |
| 5,740,883 A * | 4/1998 | Trank | ......................... | E06C 7/14 248/210 |
| 5,782,314 A * | 7/1998 | Zeitler | ....................... | E06C 7/14 248/210 |
| 7,270,307 B2 * | 9/2007 | Zodnik | ...................... | E06C 7/14 248/238 |
| D634,541 S * | 3/2011 | Gutierrez | ........................ | D3/313 |
| D685,110 S * | 6/2013 | Lusin | ......................... | E06C 7/14 D25/68 |
| 8,490,747 B2 * | 7/2013 | Winslow | .................. | E04G 5/003 182/119 |
| 8,596,454 B1 * | 12/2013 | Carlson | .................... | B25H 3/06 248/210 |
| 8,881,917 B1 * | 11/2014 | Sooknanan | ............. | E04G 5/003 248/238 |
| 8,925,685 B2 * | 1/2015 | Dufour | ...................... | E06C 7/14 248/210 |
| 9,113,735 B1 * | 8/2015 | Jansma | .............. | A47G 23/0208 |

(Continued)

FOREIGN PATENT DOCUMENTS

CN 109577625 A * 4/2019 ............... E04G 1/15

*Primary Examiner* — Jonathan Liu
*Assistant Examiner* — Guang H Guan

(57) ABSTRACT

A system for mounting to a scaffold comprises a holder and a shelf. The holder includes a first slot for receiving a drink container, e.g., a large cup, and a second slot for receiving a phone, e.g., a smart phone. The shelf includes apertures for receiving tools. The holder is configured to attach to the shelf, which can mount on the scaffold, for providing added workspace and more places to put tools.

8 Claims, 14 Drawing Sheets

(56) References Cited

U.S. PATENT DOCUMENTS

| | | | | |
|---|---|---|---|---|
| 9,609,100 B2* | 3/2017 | Litterello | ............... | H04M 1/04 |
| 9,714,542 B1* | 7/2017 | Harcz | ...................... | E06C 7/14 |
| 2004/0129184 A1* | 7/2004 | Kraker | ............... | E04H 12/2223 |
| | | | | 108/50.12 |
| 2005/0258002 A1* | 11/2005 | Sabo | ...................... | E06C 7/14 |
| | | | | 182/129 |
| 2010/0011679 A1* | 1/2010 | Monaco | .................. | E04G 3/26 |
| | | | | 52/126.1 |
| 2020/0123855 A1* | 4/2020 | Gian | ...................... | E06C 1/18 |
| 2022/0010566 A1* | 1/2022 | Kotter | .................. | E04G 5/003 |

* cited by examiner

PHONE AND DRINK HOLDER

FIELD OF THE DISCLOSURE

The present disclosure relates to a system to stow phone, drink, and/or selected equipment safely and securely onto a scaffold.

BACKGROUND OF THE INVENTION

Some of the patent documents listed below disclose an apparatus that is used in a stadium, a theater, in front of a scaffold, within confines of a scaffold, partially on a scaffold, or in an automobile or boat. Also, some of the patent documents listed below disclose an apparatus fit on a ladder and between bed mattresses.

| Related Patent Document | Publication Date | Inventor |
| --- | --- | --- |
| US-3,698,675-A | Oct. 17, 1972 | Lerew et al. |
| US-4,718,555-A | Jan. 12, 1988 | Amberg |
| US-5,158,023-A | Oct. 27, 1992 | Allen |
| US-5,626,353-A | May 6, 1997 | Campbell |
| US-6,098,749-A | Aug. 8, 2000 | Enochs |
| US-6,902,034-B2 | Jun. 7, 2005 | Gibson et al. |
| US-2005/0211742-A1 | Sep. 29, 2005 | Mapes et al. |
| US-7,290,746-B2 | Nov. 6, 2007 | Macias et al. |
| US-8,550,550-B2 | Oct. 8, 2013 | Cassese et al. |
| US-10,548,412-B2 | Feb. 4, 2020 | Cass |
| US-10,576,905-B1 | Mar. 3, 2020 | MacNeil et al. |
| US-D878,279-S | Mar. 17, 2020 | MacNeil et al. |
| US-D890,740-S | Jan. 21, 2020 | Khubani et al. |
| US-10,717,396-B2 | Jul. 21, 2020 | MacNeil et al. |
| US-D907,029-S | Jan. 5, 2021 | Khubani et al. |

U.S. Pat. No. 5,158,023-A

Designed for sheet rock finishers in which the table hooks to the scaffold cross members.

U.S. Pat. No. 10,548,412-B2

There is disclosed a portably suspended retractable shelf for storing bedside items aid which includes a horizontal platform having an inner portion and an outer portion.

U.S. Pat. No. 5,626,353-A

Used for the sports arena.

U.S. application Ser. No. 15/624,830

Designed for a car.

U.S. Pat. No. 3,698,675-A

A hanger there from uprising from the body portion and terminating in an offset portion to grip chair backs or the like.

U.S. Pat. No. 8,550,550-B2

A generally cylindrical cup sized and shaped lower section and a larger container or multiple container upper or adjacent section for holding snack foods or additional cups.

U.S. Pat. No. 7,290,746-B

A Beverage Container Holder Supported Tray Assembly: "includes a beverage container holder component and a tray component hingedly coupled to the beverage container holder component and provides one or more utilitarian support surfaces that may be used for various functions such as food and beverage placement, writing, and other activities where a stable, conveniently positioned surface is desired; and is adapted for use in theaters, stadiums, indoor and outdoor sports arenas, convention halls, home entertainment centers, and the like."

US-2005/0211742-A1

The apparatus is specifically in use as an article support, base member 4 of article support member 1 is inserted into the cavity defined by wall 202. A post-mounted storage caddy comprises a caddy body adapted to be mounted to a post, and especially a seat post in a boat. A storage tray with compartments is pivotally mounted to the caddy body, whereby the caddy body functions as a lid for the storage caddy. The storage caddy can also include a cup holder and other holding means. The interaction of article support 1 and base support member 115 to provide support for article support portion 7 of article support I is as follows, with particular reference to FIGS. 1A and 4."

"A force exerted at point P1, due to the same downward pressure, is directed opposite to the force at point P2. Thus, the forces at both P1 and P2, due to the downward pressure on article support portion 7, are directed substantially perpendicularly to the downward force."

"In addition, as with the wedging action of the aforementioned BRIDGES applications and patent, the more that downward pressure is applied to article support portion 7, the greater the wedging force becomes."

"Post-mounted storage caddy, due to its relatively low profile and its aesthetic appeal, base support member 115 or 116 is well suited for use in an automotive vehicle, aircraft, boat, or rail or other vehicle, where its use cannot be hidden from view and there is generally no convenient location for placing a beverage container."

The Phone and Drink Holder is used on a scaffold or any other mounting that it will fit Post-mounted Storage Caddy, as stated above, "Specifically, in use as an article support, base member 4 of article support member 1 is inserted into the cavity defined by wall 202." "The base member 4 of article support member 1 is inserted into the cavity." However, "The Phone and Drink Holder" Cylinder Sleeve Mounts, mount OVER the Scaffold round tubes. It mounts on the exterior of the scaffold round tubes not the interior.

"The member is tilted as by downward pressure Under such conditions, a wedging action occurs between two spaced points of contact, P1 and P2, as shown in FIG. 4. As with the wedging action of the aforementioned BRIDGES applications and patent, the more that downward pressure is applied to article support portion 7, the greater the wedging force becomes."

However, "The Phone and Drink Holder" is stabilized with set screws.

"Post-mounted Storage Caddy" and the "Phone and Drink Holder" systems are fundamentally different.

U.S. Pat. No. 10,576,905-B1

This is a combination of the two—a cup holder and phone for a Vehicle.

U.S. D878,279-S

This is a combination of the two—a cup holder and phone for a Vehicle.

U.S. D890,740-S

Holds the item in place by support and contraction.

U.S. Pat. No. 10,717,396-B2

This is a combination of the two—a cup and phone holder for a Vehicle.

U.S. D907,029-S

This is a device holder which attaches by suction.

U.S. Pat. No. 6,098,749-A

This invention is a plastic basket with closed ended tubes on each end of the basket, with a upper cross bar.

"The "Work Holder" Scaffold extendable members or as it is called "Slides" #7. This #7 "Slides" is a scaffold tube which extends from the interior of the base scaffold tube. The spring clamps bold the scaffold tubes in place, so they do not retreat. The work basket 8, into closed and sockets 9 of which scaffold extendable members slides #7 extend. The work basket 8 and the closed end sockets 9 move up and down with the extendable tubes. Clamp means are provided for holding the extendable members in selected positions with respect to the base member, and a work holder is mounted at an upper end of the extendable members. The work holder is a plastic basket with an integral socket into which upper ends of the extendable members are fitted. The basket is made of a high impact plastic, and the sockets are molded integrally with the rest of the basket."

For one, the scaffolds are two different styles. Mr. Enoch's scaffold slides up and down. The "Phone and Drink Holder" type of scaffold refers to is stationary where another scaffold is placed upon the first one and so forth to the height desired. However, the two design ideas are different.

If the "Phone and Drink Holder" is mounted upon the "Work Holder" scaffold, the "Phone and Drink Holder" could move up and down the Scaffold and secure at whatever level the craftsman so desired. The #7 "Slides" or scaffold tube would not move up and down but remain stationary. The "Work Holder" would remain on top of the scaffold extended tubes. It would move to the height the scaffold tube are extended.

The "Work Holder" has closed-ended sockets.

Whereas, the "Phone and Drink Holder" has open-ended cylinder sleeve mounts which allows it to freely move up and down the tubes. The "Work Holder" closed ended sockets Prohibit the work basket from moving up and down the tubes.

The "Work Holder" closed-ended sockets are fully molded into the basket.

The "Phone and Drink Holder" is designed with one mounting slot with an open top and open bottom with a set screw to stabilize it. The "Phone and Drink Holder" can slide up and down the scaffold tube and set wherever the craftsman so desired.

The "Work Holder" will remain at the top of the scaffold tubes.

The "Phone and Drink Holder—Shelf" open design of the cylinder sleeve mounts at attached on the top horizontal plane and the bottom horizontal plane which may project past the top and does project past the bottom horizontal plane. The "Phone and Drink Holder" cylinder sleeves, each have stabilizing braces attached to the bottom center plane and attached to the cylinder sleeve mount.

The "Work Holder" does not secure it to the #7 "Slides" or scaffold tube.

The "Phone and Drink Holder" has a set screw to secure it against the scaffold. The "Work Holder" has a plastic basket.

The "Phone and Drink Holder" was designed for a different scaffold than the "Work Holder". The "Phone and Drink Holder" is designed to secure a phone and drink on one side of the scaffold to assist craftsmen. It also can be attached to the Shelf which can stow tools and give a working space, which is secured to the scaffold top round tubes which will work with the scaffold.

The "Work Holder" is a basket full of tools and supplies stacked together.

The "Phone and Drink Holder—Shelf" configuration is designed to get the maximum working area out of the coveted space which can orderly stow power tools, hand tools, supplies, drink, and phone, and be secured on top of a scaffold.

The two apparatuses are designed differently for distinctly-different scaffolds and function differently. The two apparatuses are simply different.

The present creation contemplates a new and innovative "Phone and Drink Holder" to stow phone, drink, and/or selected equipment safely and securely onto a scaffold.

Several patents have been found where an apparatus is used in a stadium, a theater, in front of a scaffold, within the confines of the scaffold, partially on a scaffold, or in an automobile or boat. Others have been found to fit the apparatus on a ladder and between bed mattresses.

BRIEF SUMMARY OF THE INVENTION

The Phone and Drink Holder is conveniently supported on the scaffold round tube. If the craftsman needs a platform for items, the Shelf can easily be mounted on the scaffold round tubes. Each can be used independently of each other or in combination. The Shelf is mounted first, then the Phone and Drink Holder is mounted over the scaffold round tube onto the already mounted Shelf with two set screws to stabilize it.

The condensed design does not invade the scaffold area. It aids in the function of the scaffold and makes the job at hand more productive. The phone, drink, and the tools and/or supplies are easily accessible.

The Phone and Drink Holder and Shelf condensed design consists of the Phone and Drink Holder attached to the Shelf. The two tool apertures are located on the opposite end of the Phone and Drink Holder. One of the cylinder sleeve mounts with the set screw is on one end of the shelf. The other set screw is crafted in the front face of the Phone and Drink Holder over the cylinder sleeve mount. The bottom portion of the cylinder sleeve mount is located directly under the Phone and Drink Holder cylinder sleeve mount. The drink slot, the phone slot and the cylinder sleeve mount are displayed. The shelf rim is positioned on top of the edge of the shelf. The two cylinder sleeve mounts protrude perpendicularly above the horizontal plane and below the horizontal plane with a fastener (17) on each cylinder sleeve mount. Each cylinder sleeve mount is supported with three stabilizing braces below the horizontal plane and the two-cylinder sleeve mounts, do mount upon the scaffold's top joint round tubes. The alternate two-cylinder sleeve mounts with the square base, mount upon the scaffold top joint round tubes and over the scaffold square frame.

The Phone and Drink Holder can be made by a person having rudimentary skills in craft, primarily a basic ability to forge, 3d print, or a plurality of other fabrication procedures. The Tool Organizer can be made of carbon fiber, plastic, aluminum, or a plurality of other materials.

In summary, the present application discloses a system for mounting to a scaffold (8), the system comprising:
 (i) a holder (11) configured to hold a drink container and a phone, the holder including:
  a front side (18);
  a rear side (19) opposing the front side of the holder;
  a left side (20);
  a right side (21) opposing the left side of the holder;
  a top side (22);
  a bottom side (23) opposing the top side of the holder,
  a first slot (1) arranged on the top side of the holder and configured to receive the drink container;
  a second slot (2) arranged on the top side of the holder and configured to receive the phone;
  one or more attachment holes (13) arranged on the bottom side of the holder;
  a mounting slot (3) extending through the holder, the mounting slot having an open top (27) on the top side of the holder and an open bottom (28) on the bottom side of the holder, the mounting slot configured to receive a first top joint round tube (6) of the scaffold; and a set screw (5) arranged on the front side of the holder and configured to secure the holder to the scaffold; and (ii) a shelf (10) configured to couple to the holder, the shelf including:

a top side (24);

a bottom side (25) opposing the top side of the shelf;

a rim (9) extending upwardly from the top side of the shelf;

a first aperture (14) configured to receive a first tool;

a second aperture (15) configured to receive a second tool;

one or more attachment holes (26);

a first cylinder sleeve mount (16, distal from the first aperture 14) configured to receive the first top joint round tube of the scaffold, the first cylinder sleeve mount extending upwardly above the top side of the shelf and downwardly below the bottom side of the shelf;

a second cylinder sleeve mount (16, adjacent to the first aperture 14) configured to receive a second top joint round tube of the scaffold, the second cylinder sleeve mount extending upwardly above the top side of the shelf and downwardly below the bottom side of the shelf;

a first fastener (17, distal from the first aperture 14) arranged on the first cylinder sleeve mount;

a second fastener (17, adjacent to the first aperture 14) arranged on the second cylinder sleeve mount;

a first plurality of stabilizing braces (12, distal from the first aperture 14) arranged below the bottom side of the shelf to support the first cylinder sleeve mount;

a second plurality of stabilizing braces (12, adjacent to the first aperture) arranged below the bottom side of the shelf to support the second cylinder sleeve mount;

(iii) wherein the shelf is configured to mount on the scaffold with the first and second top joint found tubes of the scaffold respectively received within the first and second cylinder sleeve mounts of the shelf and with the first and second fasteners of the shelf tightened against the first and second top joint round tubes of the scaffold;

(iv) wherein the holder is configured to attach to the shelf and mount on the scaffold with the first cylinder sleeve mount of the shelf arranged within the mounting slot of the holder, with the set screw of the holder tightened against the first top joint round tube of the scaffold, and with one or more attachment fasteners tightened within the one or more attachment holes of the shelf and the one or more attachment holes of the holder.

BRIEF DESCRIPTION OF THE DRAWINGS

The present description will be understood with attention to and with reference to, the following drawings viewed in conjunction with the detailed description of the apparatus referring thereto, in which like reference numbers throughout the drawings designate like structure, and in which.

DETAILED DESCRIPTION-OF THE DRAWINGS

It is to be noted that the drawings presented are intended solely for the purpose of illustration and are therefore, neither desired nor intended to limit the scope of the disclosure to any or all of the exact details of construction shown, except insofar as they may be regarded as necessary to the claimed invention. The invention, however, is not intended to be limited to the specific terminology so selected.

Figure 1:
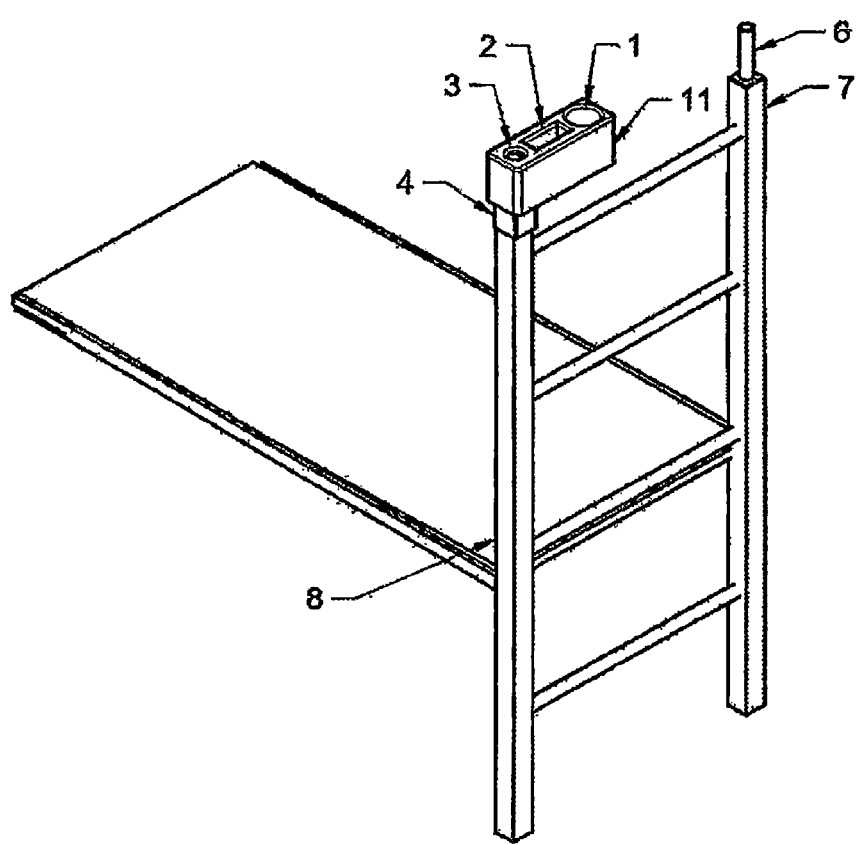
FIG. 1 is the perspective drawing of the Phone and Drink Holder.

FIG. 1 is the perspective drawing of the "11" Phone and Drink Holder mounted on the "8" scaffold with the "3" mounting slot and the "4" square base.

Figure 2:
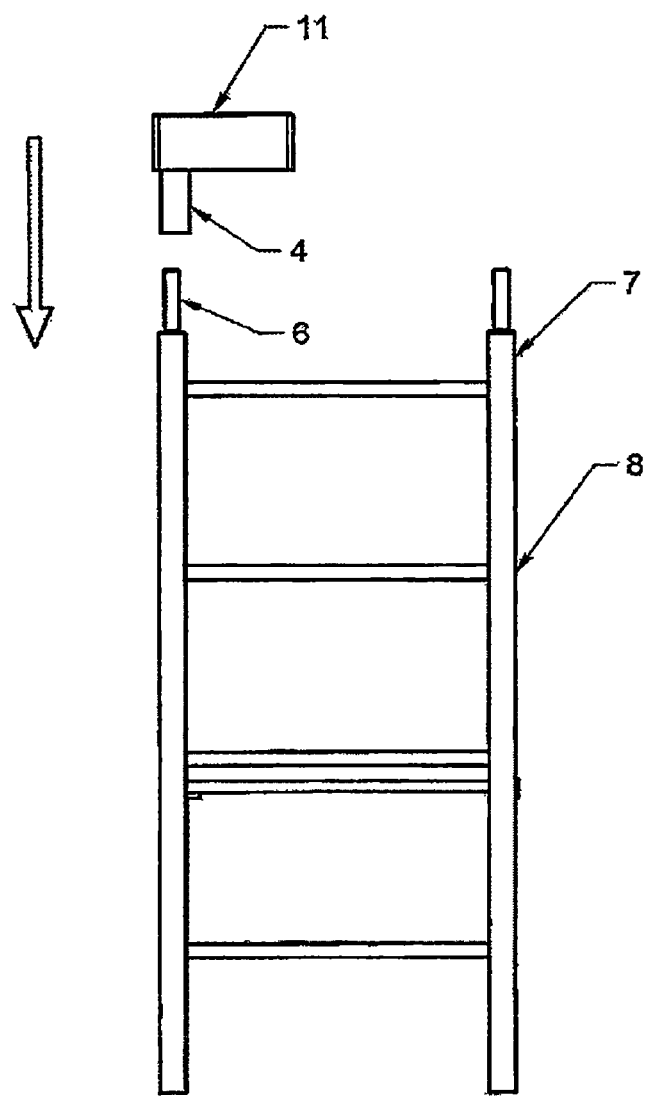
FIG. 2 is the rear drawing of the Phone and Drink Holder suspended over scaffold.

FIG. 2 is the rear-view drawing of the "11" Phone and Drink Holder suspended over a "8" scaffold with the "3" mounting slot and the "4" square base. The arrow is showing the downward motion of the "11" Phone and Drink Holder to mount upon the "8" scaffold.

Figure 3:
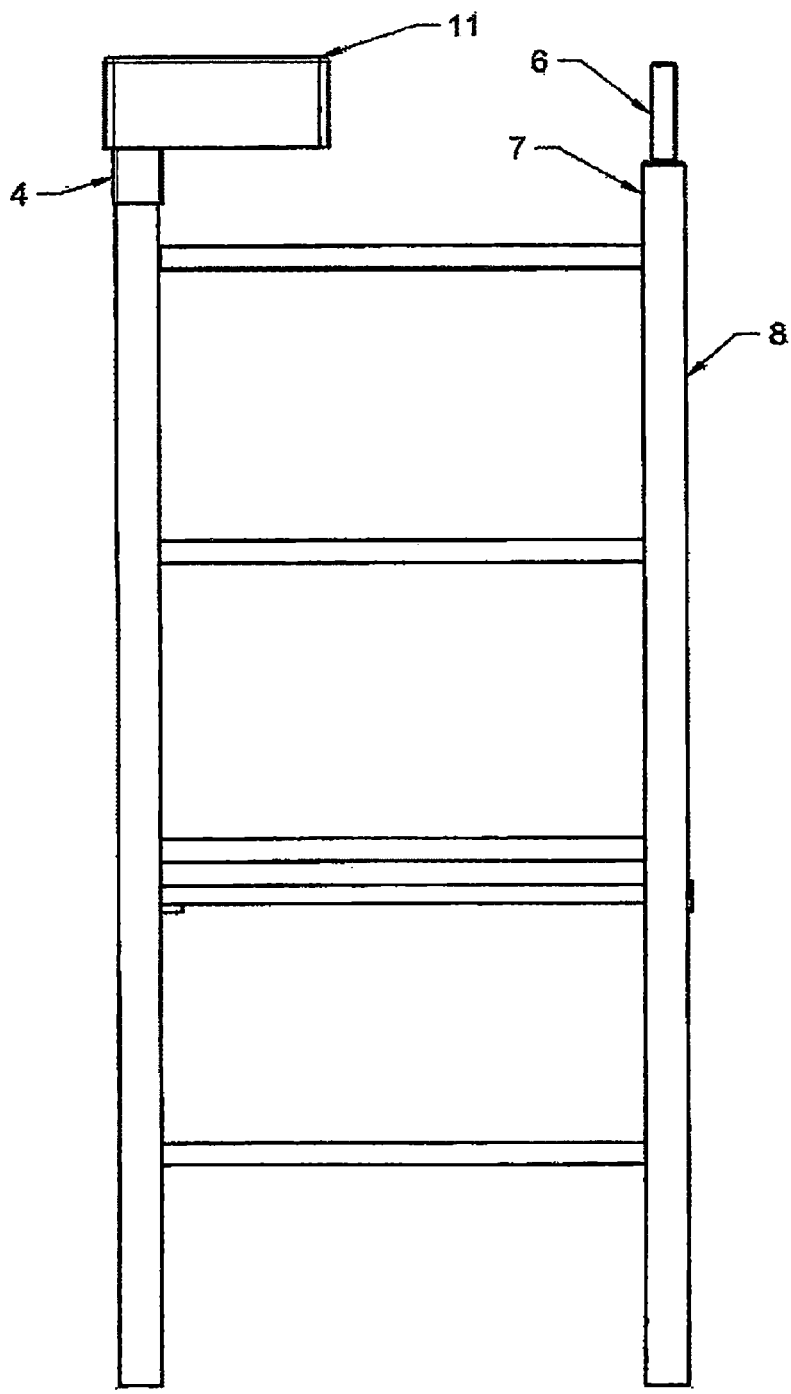
FIG. 3 is the drawing of the Phone and Drink Holder mounted on the scaffold.

FIG. 3 is the rear-view drawing of the "11" Phone and Drink Holder mounted on the "8" scaffold.

Figure 4:
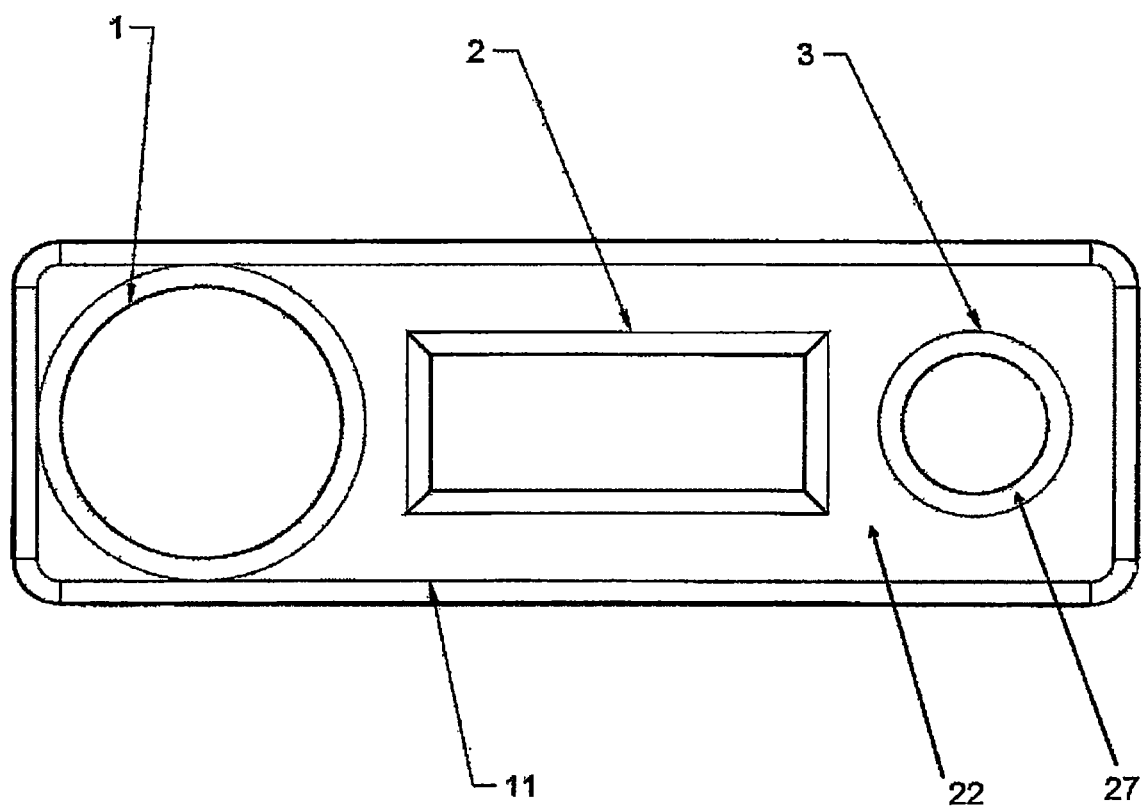
FIG. 4 is the top view drawing of the Phone and Drink Holder.

FIG. 4 is the top view drawing of the "11" Phone and Drink Holder show the "1" drink slot, the "2" phone slot, and the "3" mounting slot on the "22" top side.

Figure 5:
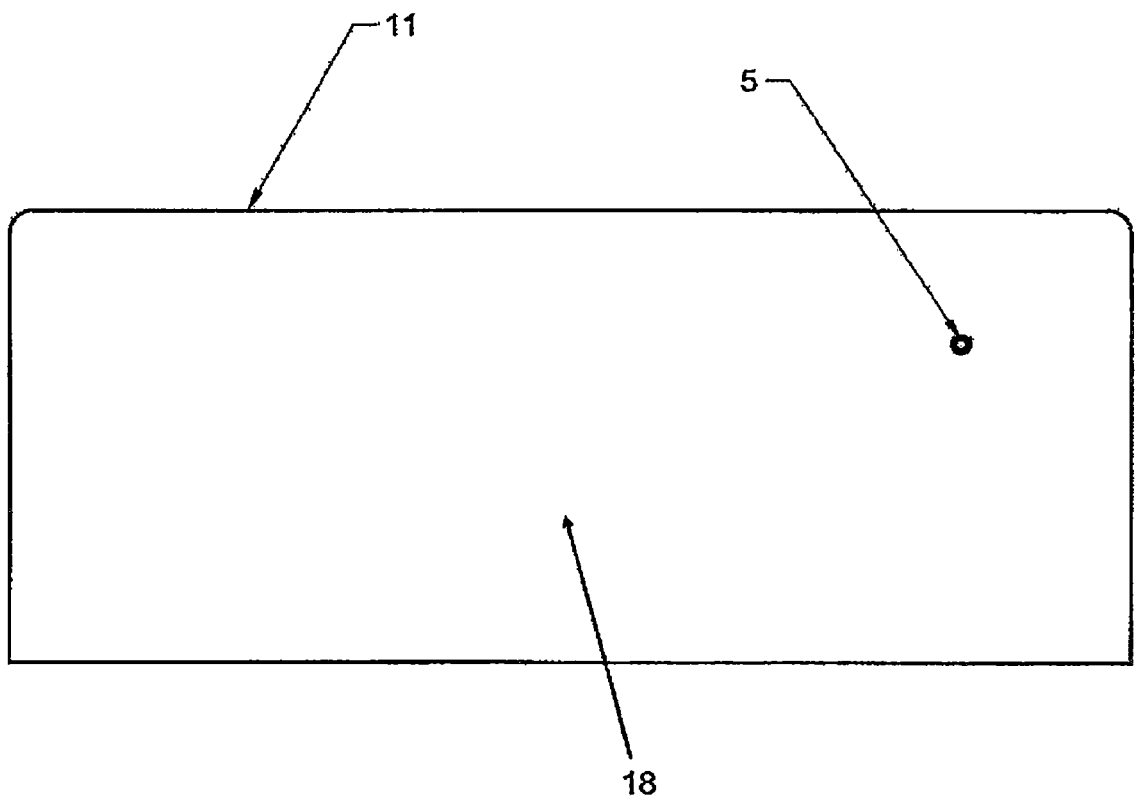
FIG. 5 is the front view drawing of the Phone and Drink Holder.

FIG. 5 is the front view drawing of the "11" Phone and Drink Holder with the "18" front side where the "S" set screw is located.

Figure 6:
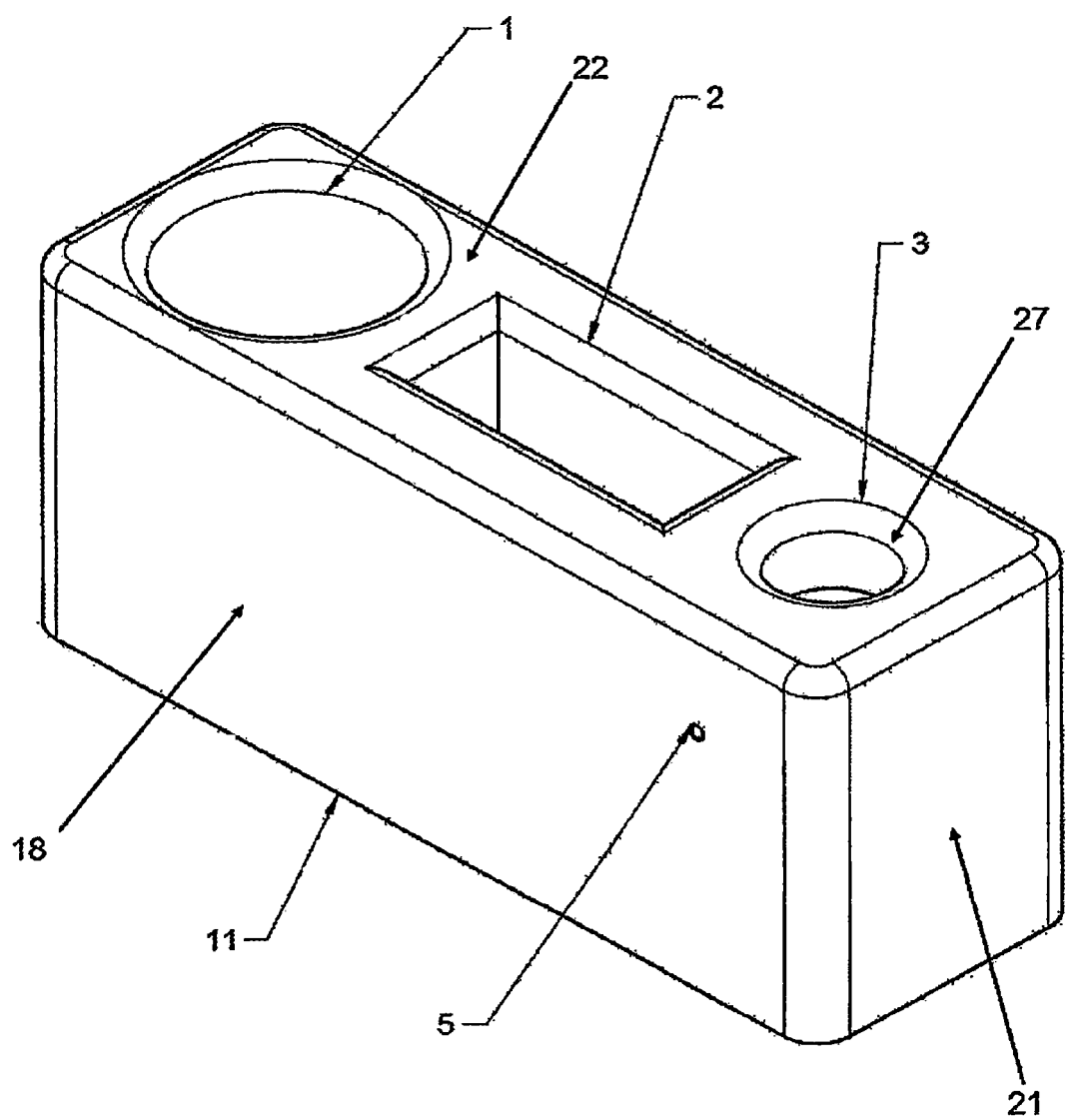
FIG. 6 is the right view drawing of the Phone and Drink Holder.

FIG. 6 is the perspective view drawing of the "11" Phone and Drink Holder with the "1" drink slot, the "2" phone slot and the "27" open top of the "3" mounting slot. The "5" set screw is located on the "18" front face of the Holder.

Figure 7:
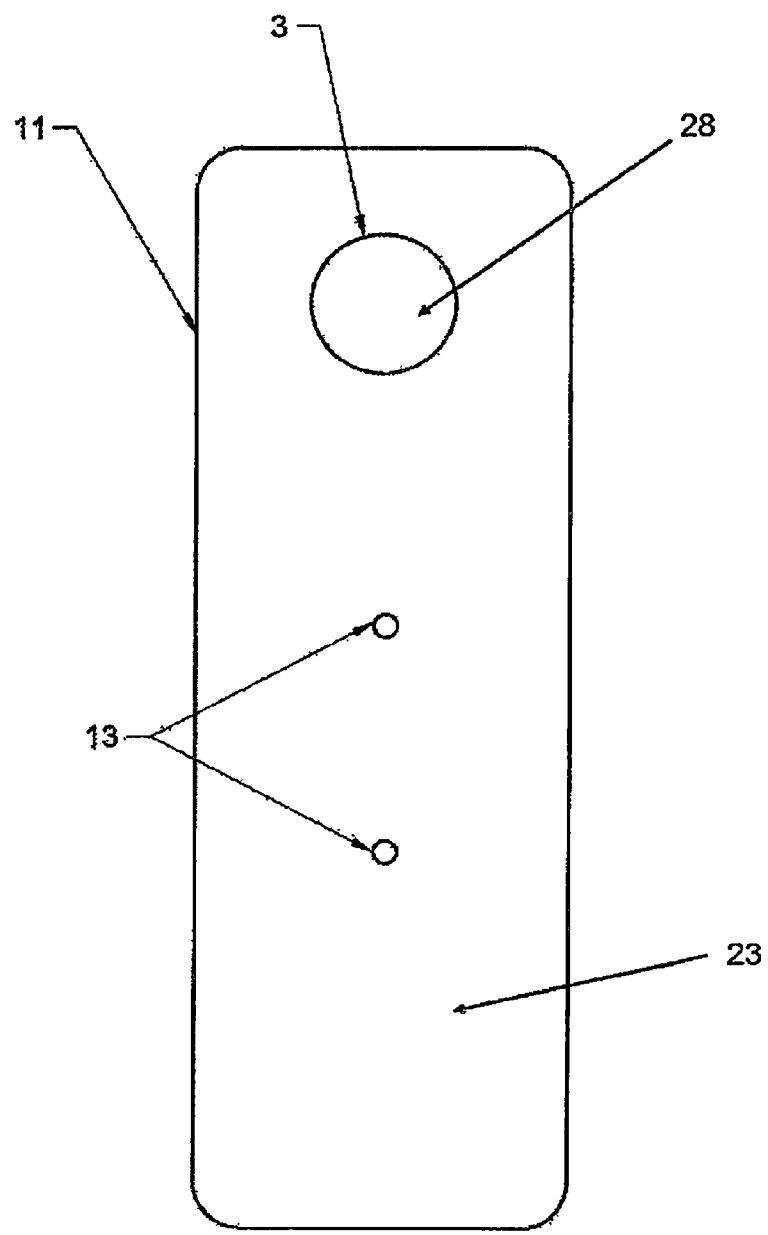
FIG. 7 is the bottom view drawing of the Phone and Drink Holder.

FIG. 7 is the bottom view drawing of the "11" Phone and Drink Holder which reveals the "28" open bottom of the "3" mounting slot and the "13" attachment screw holes on the "23" bottom side.

Figure 8:
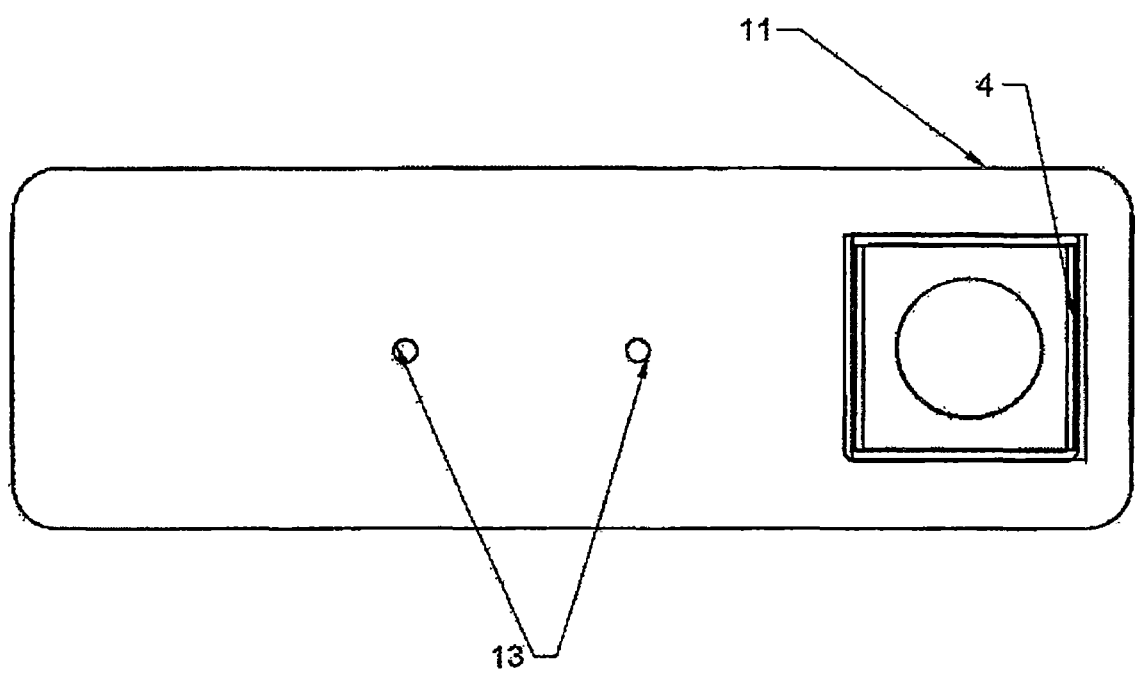
FIG. 8 is the bottom view drawing of the Phone and Drink Holder.

FIG. 8 is the bottom view drawing of the "11" Phone and Drink Holder with the "3" mounting slot, the "4" square base, and the two "13" attachment screw holes.

Figure 9:
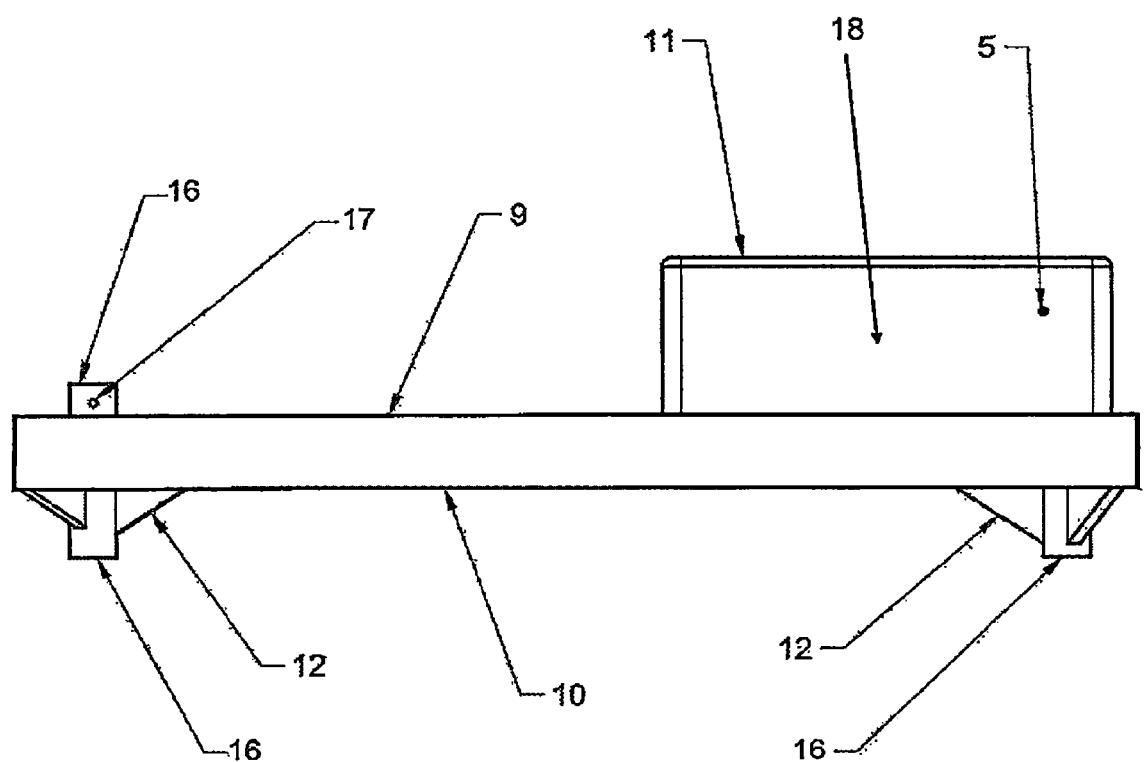
FIG. 9 is the front view drawing of the Phone and Drink Holder on the Shelf.

FIG. 9 is the front view drawing of the "11" Phone and Drink Holder on the "10" Shelf. The "16" cylinder sleeve mounts are reinforced with the "12" stabilizing braces. The one "17" set screw is located on the "16" cylinder sleeve mount and the second one has been crafted in the front face of the "11" Phone and Drink Holder. The "10" shelf has a "9" rim on the top of it.

Figure 10:
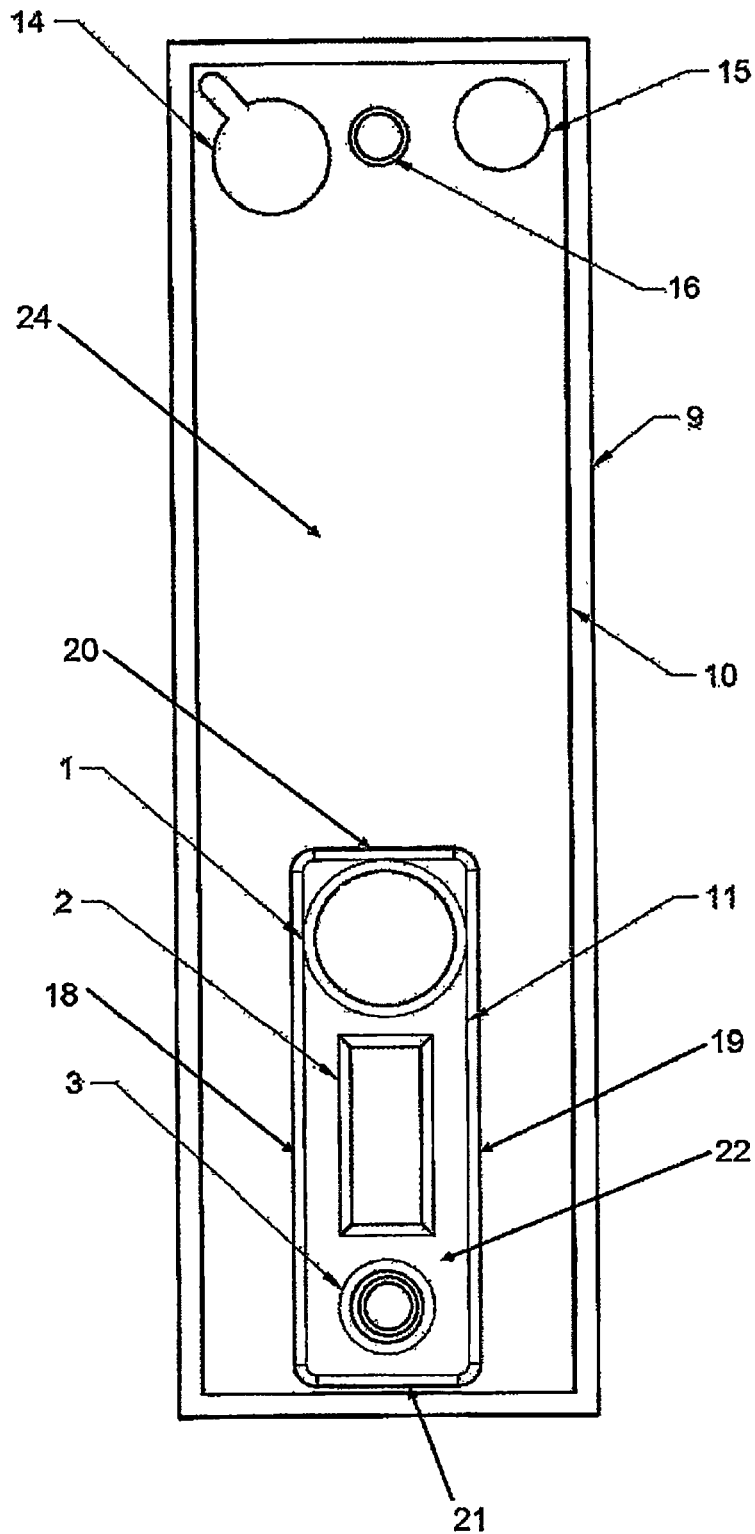
FIG. 10 is the top view drawing of the Phone and Drink Holder on the Shelf.

FIG. 10 is the top view drawing of the "11" Phone and Drink Holder attached on the "24" top side of the "10" shelf.

The "14" and "15" tool apertures are located on one end of the "10" shelf and the "11" Phone and Drink Holder is located at the other end. The "11" Phone and Drink Holder has the "18" front side, the "19" rear side, the "20" left side, the "21" right side, and the "22" top side. The two "16" cylinder sleeve mounts are positioned on each end of the "10" shelf. One of the cylinder sleeve mounts is crafted into the "11" Phone and Drink Holder because it is designed to be mounted on the "8" scaffold without the "10" shelf. The "1" drink slot, the "2" phone slot, and then the "3" mounting slot are in this order. The "9" shelf rim is positioned on top of the edge of the "10" shelf.

Figure 11:
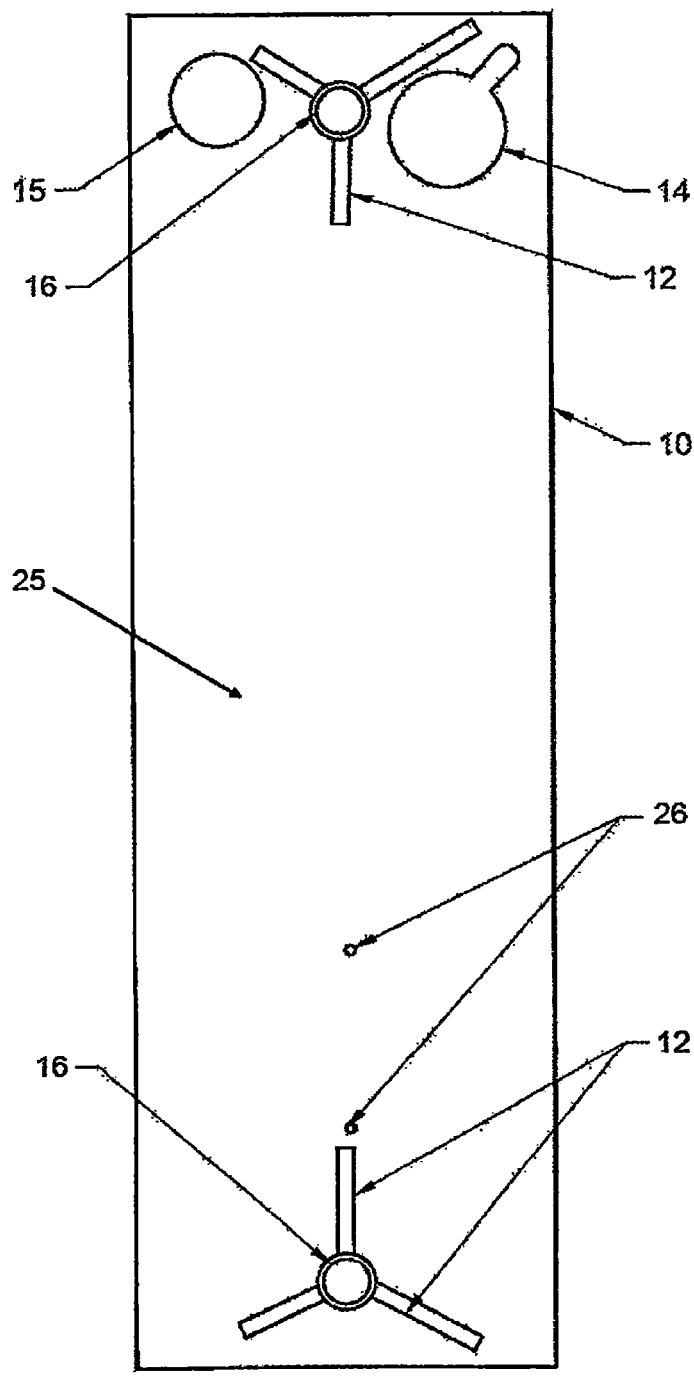
FIG. 11 is the bottom view drawing of the Phone and Drink Holder on the Shelf.

FIG. 11 is the bottom view drawing of the "11" Phone and Drink Holder which reveal the "14" and "15" tool apertures, the "16" cylinder sleeve mounts with the "12" stabilizing braces. The two "26" attachment screw holes are in the center of the "25" bottom side of the "10" shelf.

Figure 12:
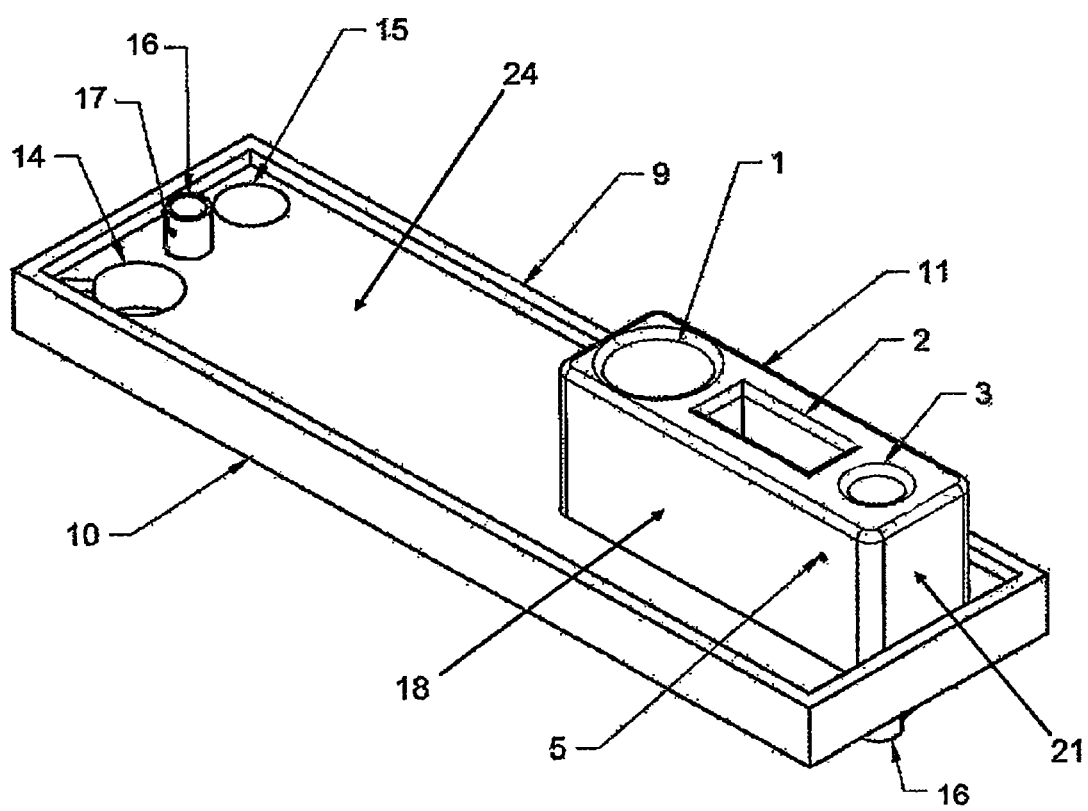
FIG. 12 is the perspective view drawing of the Phone and Drink Holder on the Shelf.

FIG. 12 is the perspective view drawing of the "11" Phone and Drink Holder attached to the "10" shelf. The two tool apertures "14" and "15" are located on the opposite end of the "11" Phone and Drink Holder. One of the "16" cylinder sleeve mounts with the "17" set screw is on one end of the "10" shelf. The other "5" set screw is crafted in the front face of the "11" Phone and Drink Holder over the "3" mounting slot. The bottom portion of the "16" cylinder sleeve mount is located directly under the "II" Phone and Drink Holder "3" mounting slot. The "1" drink slot, the "2" phone slot and the "3" mounting slot are displayed. The "9" shelf rim is positioned on top of the edge of the "10" shelf.

Figure 13:
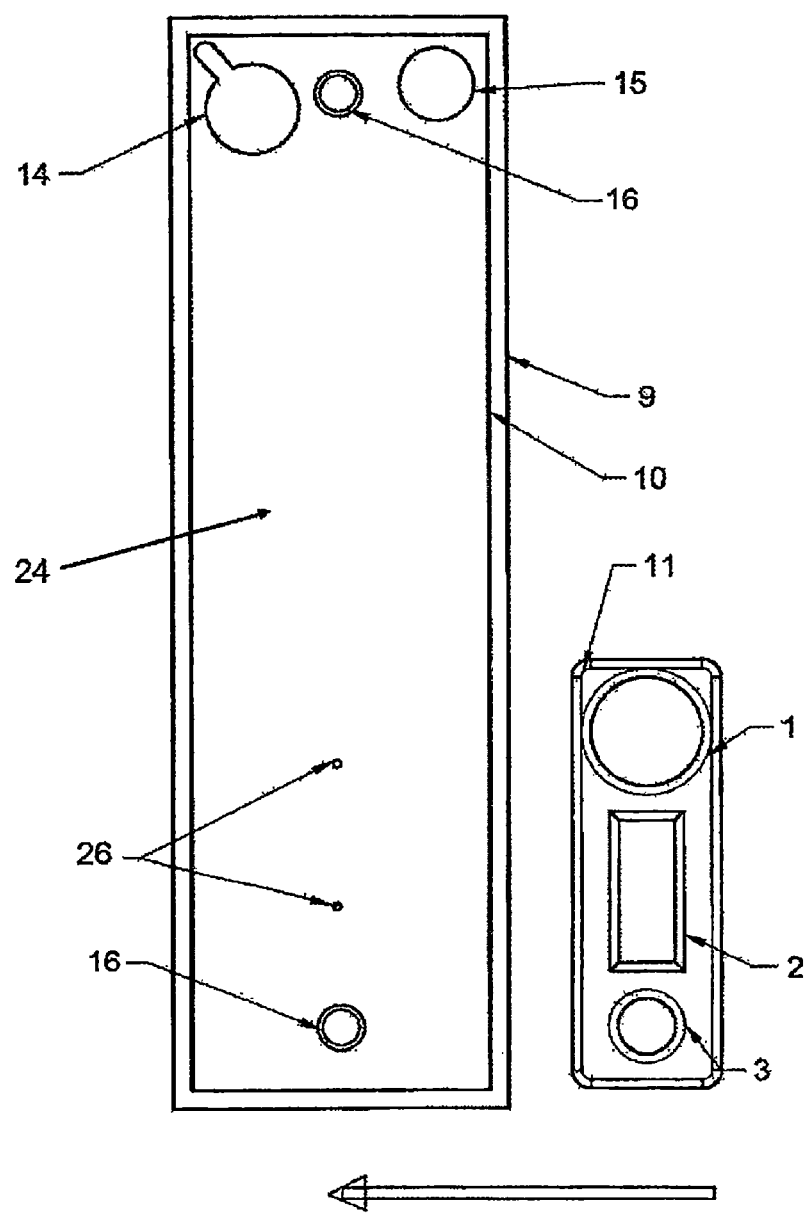
FIG. 13 is the top view drawing of the Shelf and the Phone and Drink Holder are separated.

FIG. 13 is the top view drawing of the "10" shelf and the "11" Phone and Drink Holder are separated. The two tool apertures "14" and "15" on the shelf are on the opposite end of the location for the "11" Phone and Drink Holder. The two "16" cylinder sleeve mounts are located in the center of each end of the "10" shelf. The "11" Phone and Drink Holder has two "13" attachment screw holes which are in the center of the "24" top side of the "10" shelf close to the "16" cylinder sleeve mounts. The arrow shows the direction the "11" Phone and Drink Holder attach to the "10" shelf.

Figure 14:
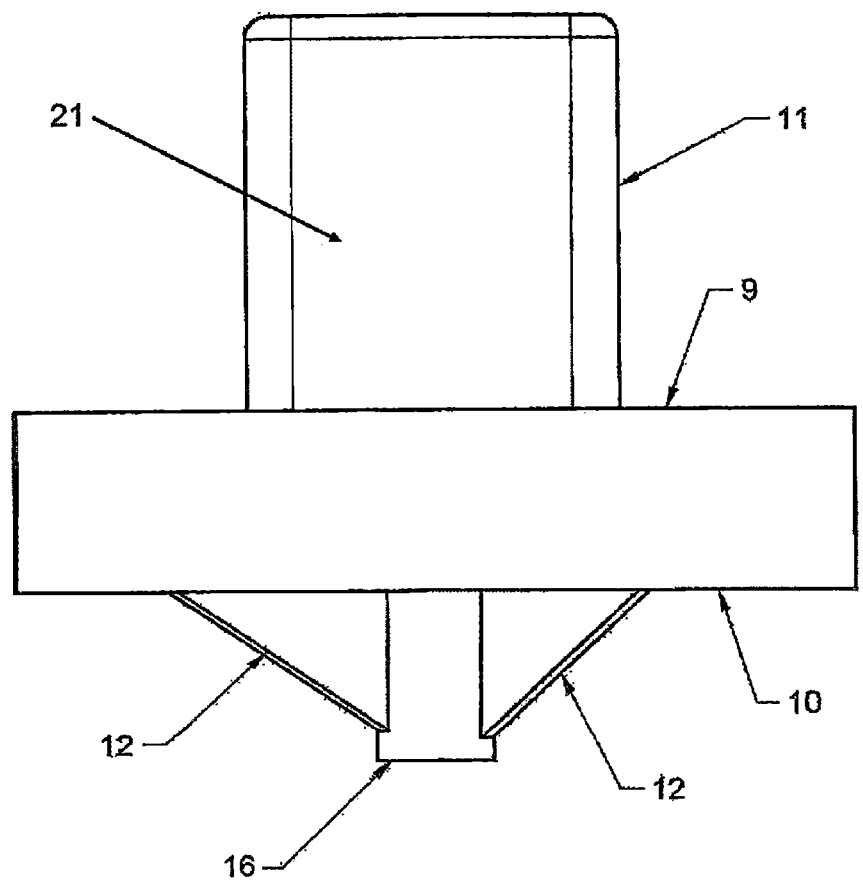
FIG. 14 is the right end view drawing of the Phone and Drink Holder.

FIG. 14 is the right view drawing of the "11" Phone and Drink Holder. The "10" shelf and "9" shelf rim are revealed. The "16" cylinder sleeve mount and the "12" stabilizing braces are displayed. The "21" right side of the "11" Phone and Drink Holder is also displayed.

In relating classic embodiments of the device of the current discloser exemplified in the drawings, specific jargon is used for the sake of clarity. The creation, however, is not intended to be restricted to the precise terminology so selected, and it is to be understood that each detailed element includes all technical equals that function in a comparable manner to achieve a similar resolve.

DETAILED DESCRIPTION OF THE INVENTION

The present disclosure relates generally to the construction field with consideration of refreshment and communication, the work area, and makes the job orderly for more efficient production upon a scaffold.

The craftsmen may need to be refreshed with a cold drink and/or talk to the boss or customer. The craftsman would normally have to interrupt his workflow by getting off the scaffold to answer or use the phone or get a drink. This would, as always, be inefficient. A smart phone positioned against the scaffold square tube for communication is an accident waiting to happen. It may drop off the scaffold, or accidently be kicked off, or fall out of the toolbelt.

Many times the drink is accidently knocked over causing the craftsman to stop working to clean up the mess, other times the drink may spill on the electric tools causing them to short out, and makes the scaffold terribly slippery, therefore making it a dangerous work zone. The Phone and Drink Holder can safely hold a large cup and a smart phone, which will be out of harm's way but easily accessible on top of the scaffold top joint round tubes.

If a craftsman is tired of stepping on his tools and needs added space on the scaffold, one can easily place the "11" Phone and Drink Holder onto the "10" shelf. The craftsman can easily attach the "11" Phone and Drink Holder to the "10" shelf with two screws placed and secured in the "13" attachment screw holes. After assembled, mount the "11" Phone and Drink Holder and the "10" shelf onto the "6" scaffold top joint round tubes.

The screw gun, hammer or various other tools and can be safely stowed in the "14" and "15" tool apertures on one end of the "11" Phone and Drink Holder and the "10" Shelf. The "11" Phone and Drink Holder is affixed to the opposite end of the "10" shelf. The center of the "10" shelf can be used as an assembly area or for whatever the craftsman desires.

The "11" Phone and Drink Holder is mounted on top of one of the "6" scaffold upper joint round tubes which emerge from the "7" scaffold square tube base. The "6" scaffold's top joint round tube is where another "8" scaffold section is mounted upon the "6" scaffold's top joint round tube.

The "11" Phone and Drink Holder has crafted the "3" mounting slot into its design. The "11" Phone and Drink Holder mount on the "6" scaffold's top joint round tube. The "11" Phone and Drink Holder's "3" mounting slot holds it in place. The "5" set screws turned tight steadies the "11" Phone and Drink Holder.

Also, the "11" Phone and Drink Holder "4" the square base design holds the "11" Phone and Drink Holder in place over the "6" scaffold's top joint round tubes and the "7" scaffold square tube base. The "5" set screws turned tight steadies the "11" Phone and Drink Holder.

The "11" Phone and Drink Holder's and the "10" Shelfs "16" cylinder sleeve mounts are located on each end of the "10" shelf which mount on the two "6" scaffold's top joint round tubes.

However, where the "11" Phone and Drink Holder attaches to the "10" shelf, the "3" mounting slot is level with the top of the "10" shelf and extends downward pass the "10" shelf. The "11" Phone and Drink Holder has the "3" mounting slot designed with in it. So, when the "11" Phone and Drink Holder is attached to the "10" shelf it is stabilized by the internal "3" mounting sleeve and the "10" shelf's "16" cylinder sleeve mount which extend below the "10" shelf. Also, the "11" Phone and Drink Holder and the "10" Shelf may use the alternate mount which is the "4" mounting slot with the square base design. The "11" Phone and Drink Holder and the "10" Shelf are mounted on the "6" scaffold's top joint round tubes and the "7" scaffold square tube base. The "5" set screws turned tight steadies the "11" Phone and Drink Holder.

The "11" Phone and Drink Holder and the "10" Shelf "16" cylinder sleeve mounts are located on each end of the "11" Phone and Drink Holder and the "10" Shelf which mounts on the two "6" scaffold's top joint round tubes. The "11" Phone and Drink Holder and the "10" Shelf "16" cylinder sleeve mounts hold it in place. Also, the alternate mount, the "4" cylinder sleeve mount with the square base can be used. The "11" Phone and Drink Holder and the "10" Shelf with the "4" cylinder sleeve mounts with the square base design can hold the "11" Phone and Drink Holder and the "10"

Shelf in place over the "6" scaffold's top joint round tubes and the "7" scaffold square tube base. The "5" set screws turned tight steadies the "11" Phone and Drink Holder and the "10" Shelf.

The Phone and Drink Holder can be constructed by a person having ordinary skill in the art do have the ability to forged, 3d printed, or a plurality of other procedures of fabrication. The Tool Organizer can be made of carbon fiber, plastic, aluminum, or a plurality of various other materials.

Having thus described typical exemplifications of the current invention, it should be distinguished by those skilled in the art that the within disclosures are exemplary only and that numerus other options, adaptations, and variations may be made within the scope and spirit of the present invention is not restricted to the precise embodiments as illustrated herein but is only limited by the claims.

What is claimed is:

1. A system for mounting to a scaffold, the system comprising:
   (i) a holder configured to hold a drink container and a phone, the holder including:
      a front side;
      a rear side opposing the front side of the holder;
      a left side;
      a right side opposing the left side of the holder;
      a top side;
      a bottom side opposing the top side of the holder,
      a first slot arranged on the top side of the holder and configured to receive the drink container;
      a second slot arranged on the top side of the holder and configured to receive the phone;
      one or more attachment holes arranged on the bottom side of the holder;
      a mounting slot extending through the holder, the mounting slot having an open top on the top side of the holder and an open bottom on the bottom side of the holder, the mounting slot configured to receive a first top joint round tube of the scaffold; and
      a set screw arranged on the front side of the holder and configured to secure the holder to the scaffold; and
   (ii) a shelf configured to couple to the holder, the shelf including:
      a top side;
      a bottom side opposing the top side of the shelf;
      a rim extending upwardly from the top side of the shelf;
      a first aperture configured to receive a first tool;
      a second aperture configured to receive a second tool;
      one or more attachment holes;
      a first cylinder sleeve mount configured to receive the first top joint round tube of the scaffold, the first cylinder sleeve mount extending upwardly above the top side of the shelf and downwardly below the bottom side of the shelf;
      a second cylinder sleeve mount configured to receive a second top joint round tube of the scaffold, the second cylinder sleeve mount extending upwardly above the top side of the shelf and downwardly below the bottom side of the shelf;
      a first fastener arranged on the first cylinder sleeve mount;
      a second fastener arranged on the second cylinder sleeve mount;
      a first plurality of stabilizing braces arranged below the bottom side of the shelf to support the first cylinder sleeve mount;
      a second plurality of stabilizing braces arranged below the bottom side of the shelf to support the second cylinder sleeve mount;
   (iii) wherein the shelf is configured to mount on the scaffold with the first and second top joint round tubes of the scaffold respectively received within the first and second cylinder sleeve mounts of the shelf and with the first and second fasteners of the shelf tightened against the first and second top joint round tubes of the scaffold;
   (iv) wherein the holder is configured to attach to the shelf and mount on the scaffold with the first cylinder sleeve mount of the shelf arranged within the mounting slot of the holder, with the set screw of the holder tightened against the first top joint round tube of the scaffold, and with one or more attachment fasteners tightened within the one or more attachment holes of the shelf and the one or more attachment holes of the holder.

2. The system according to claim 1, wherein:
   (i) the one or more attachment holes of the holder includes a first attachment hole and a second attachment hole;
   (ii) the one or more attachment holes of the shelf includes a first attachment hole and a second attachment hole;
   (iii) the first attachment hole of the holder and the first attachment hole of the shelf are configured to receive a first attachment fastener of the one or more attachment fasteners; and
   (iv) the second attachment hole of the holder and the second attachment hole of the shelf are configured to receive a second attachment fastener of the one or more attachment fasteners.

3. The system according to claim 1, wherein:
the first and second slots of the holder have different shapes and different sizes.

4. The system according to claim 1, wherein:
the first and second apertures of the shelf have different shapes and different sizes.

5. The system according to claim 1, wherein:
the second slot of the holder is arranged between the first slot of the holder and the mounting slot of the holder.

6. The system according to claim 1, wherein:
the rim of the shelf has a substantially rectangular shape in a top view.

7. The system according to claim 1, wherein:
the first and second cylinder sleeve mounts of the shelf are arranged on opposite ends of the shelf.

8. The system according to claim 1, wherein:
the second cylinder sleeve mount of the shelf is arranged between the first aperture of the shelf and the second aperture of the shelf.

\* \* \* \* \*